April 21, 1936.   E. S. COOK ET AL   2,038,146
MEANS FOR PREVENTING SLIDING WHEELS
Filed July 31, 1934
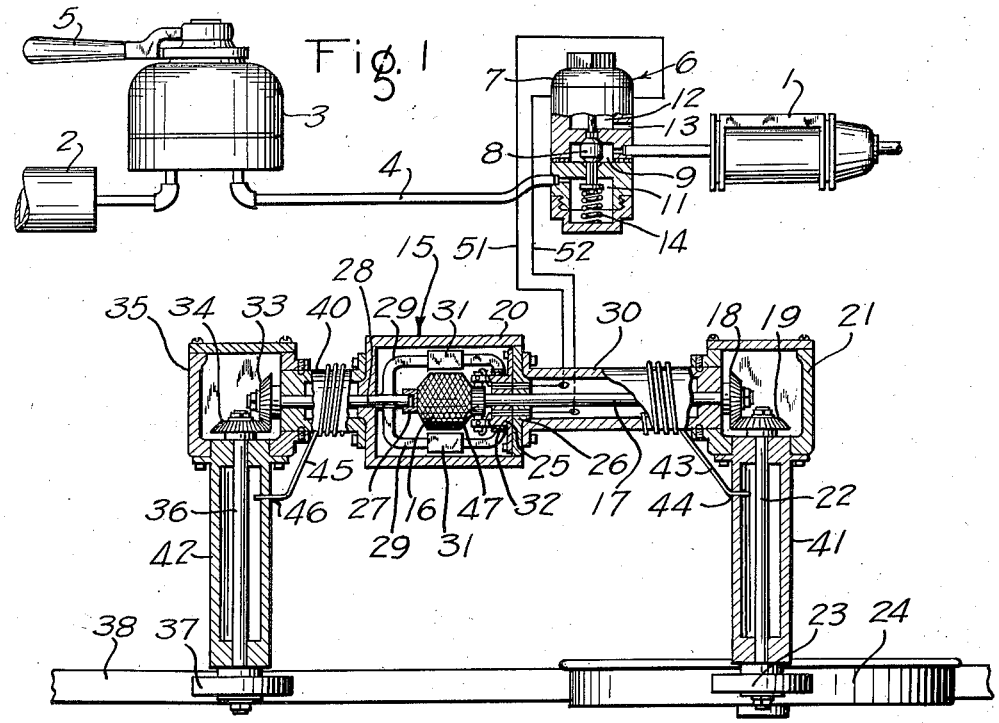
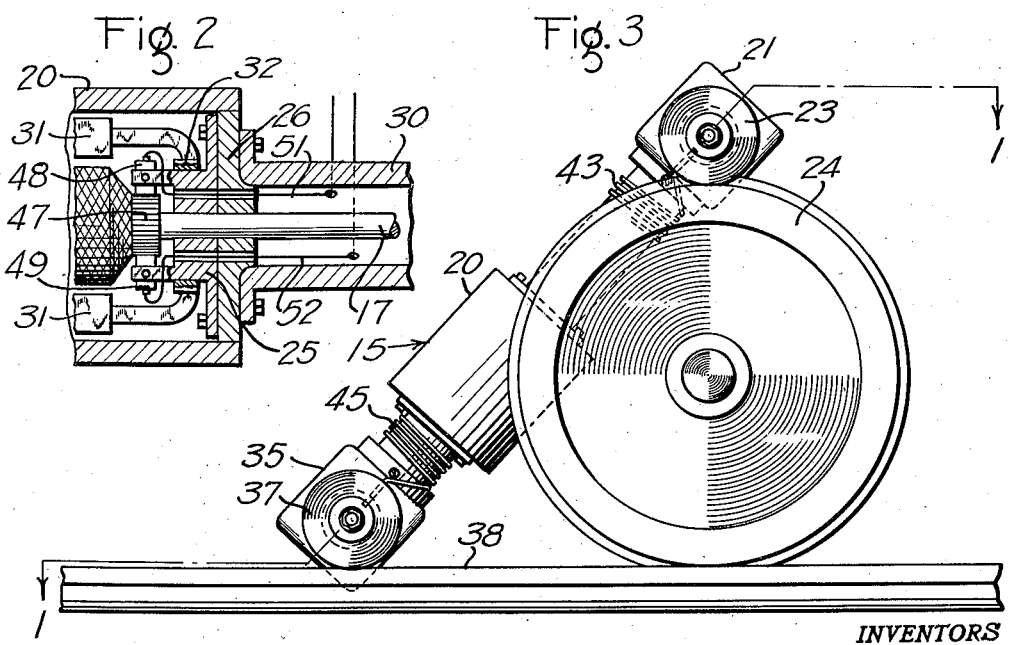
INVENTORS
EARLE S. COOK
CHARLES F. HAMMER.
BY
Wm. A. Cady
ATTORNEY Patented Apr. 21, 1936

2,038,146

UNITED STATES PATENT OFFICE 2,038,146

MEANS FOR PREVENTING SLIDING WHEELS

Earle S. Cook, Wilkinsburg, and Charles F. Hammer, Greensburg, Pa., assignors to The Westinghouse Air Brake Company, Wilmerding, Pa., a corporation of Pennsylvania Application July 31, 1934, Serial No. 737,706

14 Claims. (Cl. 303—21)

Our invention relates to brake equipment for vehicles, and more particularly to means for reducing the degree of application of the brakes should this be required in order to prevent the wheels from sliding on the rails.

It is well known that for a given braking pressure friction type brakes are less effective in retarding the motion of a vehicle at high speeds than at low speeds because the coefficient of friction between the rubbing parts is lower at high speeds than at low speeds. In order to bring a vehicle to a stop quickly it has been the usual practice for an operator to apply the brakes with a high degree of braking pressure at high speeds, and, as the speed of the vehicle decreases, to so operate the brakes as to cause the braking pressure to decrease in such manner that the vehicle is brought to a stop quickly and smoothly, without dangerous shock or skidding of the wheels.

When railway trains and traction vehicles are operated at very high speeds a correspondingly high braking force must be employed to bring the train or vehicle to a stop in a reasonable length of time. When such braking forces are applied the problem of properly reducing the braking forces by manual operation, as the vehicle slows down, becomes an increasingly more difficult one and there is considerable danger of the wheels sliding on the rails. It is therefore desirable to provide, as a part of the braking equipment on high speed trains and vehicles, some means for detecting and relieving wheel sliding when it occurs.

It is desirable that the braking force be reduced as soon as the wheel starts to slip, or while it is rotating at a speed only slightly below its free rolling speed. By reducing the braking force during the incipient stage of wheel sliding, a much less reduction in the braking force applied to the brake shoes is required to again permit free rolling of the wheel on the rails, and the average effective braking force is maintained at a higher value.

In accordance with our invention a brake unloading means is provided having an element responsive to the speed of the vehicle, and an element responsive to the peripheral speed of the wheel, the two elements operating at the same speed when the wheel is freely rolling on the rails and at different speeds if the wheel slides along the rail.

Several devices have been suggested as a means for protecting the car wheel against sliding on the rails when the braking forces on the wheel exceed the value necessary to maintain adhesion of the wheels to the rails. Such proposed devices all have one or more of the following undesirable characteristics; namely, they either do not operate until the car wheel speed is reduced to an extremely low value, they operate at a fixed wheel speed instead of upon a fixed differential between the wheel speed and the speed of the vehicle, they do not assure the wheel regaining train speed before the brakes are again applied, they do not operate after the wheel has completely stopped rotating, a reduction in the size of the wheel of the vehicle, caused by wear, changes the accuracy of the device, reversing mechanism operable either manually or automatically is required in order to operate the device in either direction of train travel, they are readily affected by shock, surges, or other impulses set up on the train.

It is an object of this invention to provide means for preventing the car wheels from sliding on the rails, and which will not be subject to any of the above outlined limitations.

Other advantages and objects of our invention will appear from the following description of one specific embodiment threof taken in connection with the accompanying drawing, in which Fig. 1 is a diagrammatic view of circuits and apparatus illustrating one preferred embodiment of the invention taken partly in section along the line 1—1 in Fig. 3.

Fig. 2 is a sectional view showing a portion of the apparatus illustrated in Fig. 1 on a larger scale, and Fig. 3 is an elevational view showing the apparatus as applied to the wheel of a railway train.

Referring to the drawing, and more particularly to Fig. 1 thereof, the numeral 1 indicates the brake cylinder of a fluid pressure brake, that is supplied with fluid under pressure from the reservoir 2, by operation of the brake valve 3 upon movement of the brake valve handle 5 to an application position in a well known manner. Fluid under pressure is also released from the brake cylinder 1 through the brake cylinder pipe 4 and ports and passages in the brake valve 3 upon movement of the handle 5 to release position.

A magnet valve device 6 is interposed in the brake cylinder pipe 4, between the brake valve 3 and the brake cylinder 1, and is provided with a magnet 7 operatively connected to a double beat valve 8 that is effective to control communication between the valve chamber 9 and an inlet chamber 11, and also between the valve chamber 9 and the atmosphere, through exhaust chamber 12 and exhaust port 13. A spring 14 is provided in the inlet chamber 11 for biasing the valve 8 to its upper seated position to close communication between the valve chamber 9 and the atmosphere, and to effect communication between the brake valve 3 and the brake cylinder 1.

An electrical differential device 15 is provided for controlling the operation of the magnet valve device 6, and comprises an electric generator having an armature winding 16 and field poles 31 of magnetic material. The armature winding 16 is operatively connected to a shaft 17 that is driven through bevel gears 18 and 19, contained in a gear box 21, the gear wheel 19 being operatively connected by a shaft 22 to a roller or wheel 23 that is in frictional engagement with the car wheel 24. The shaft 17 extends through a bearing plate 25 and an end plate 26 in a housing 20 enclosing the electrical differential device 15, and providing one bearing for the armature element 16. The other end of the armature is provided with a bearing 27, that is supported in one end of a shaft 28 from which the arms 29 of a spider extend and carry field poles 31 of magnetic material. The spider arms terminate in a bearing ring 32 surrounding a sleeve-like portion of the bearing plate 25. The shaft 28 is driven through the bevel gear wheels 33 and 34, contained in the gear box 35, and the shaft 36, by a friction roller or wheel 37 that is in frictional engagement with the track rail 38.

The mechanism also includes a housing or casing 20 that surrounds the electrical differential device 15, a casing portion 30 that surrounds the shaft 17, and extends from the housing 20 to support the gear box 21, and a casing portion 40 that surrounds the shaft 28 and extends from the housing 20 to support the gear box 35. A casing portion 41 extends from the gear box 21, surrounding the shaft 22, and a casing portion 42 extends from the gear box 35, surrounding the shaft 36.

The gear box 21 is journaled about the end of the casing portion 30, to be movable about the axis of the shaft 17, and a spring 43 is provided about the casing portion 30, having one end engaging a bore 44 in the casing portion 41, for actuating the casing 41 and the shaft 22 downwardly to cause frictional engagement between the roller 23 and the car wheel 24. In a similar manner the gear box 35 is journaled about the end of the casing portion 40, and a spring 45 is provided about the casing portion 40, having one end engaging a bore 46 in the casing portion 42, for forcing the casing portion 42 downwardly to cause frictional engagement between the roller 36 and the track rail 38.

Also mounted on the shaft 17 and operatively connected to the armature winding 16 is a commutator 47 about which are positioned cooperating brushes 48 and 49, connected respectively to conductors 51 and 52, that connect the armature winding 16 to the winding of the magnet 7.

If the car, or train, is moving along the rail 38 toward the left as viewed in Figs. 1 and 3, the small roller, or wheel, 37 and the car wheel 24 will be revolving in a counterclockwise direction and the small roller or wheel 23 will be revolving in a clockwise direction. Since the gear wheel 33, driving the shaft 28, and the gear wheel 18, driving the shaft 17, are positioned on opposite sides of the shafts 36 and 22, respectively, operation of shafts 36 and 22 in opposite directions effects the operation of the shafts 28 and 17 in the same direction. So long as the car wheel 24 is freely rolling on the rail 38 the field pole 31 will revolve about the armature winding 16 at the same rate as the armature winding revolves about its axis, and consequently no voltage will be induced within the armature winding to cause current to flow through the winding of the magnet valve device 6. Should, however, the wheel 24 start slipping on the rail 38 its rate of peripheral speed will be something less than the speed of the vehicle along the rail and the speed of the roller 23 will, consequently, be less than the speed of the roller 37 causing a relative movement between the field poles 31 and the armature winding 16 to induce a voltage within the winding 16 upon a decrease in the speed of the wheel 24 below the speed of the vehicle. A current is therefore caused to flow from the armature winding 16 through the winding of the magnet 7 of the magnet valve device 6, causing the valve 8 to be moved downwardly against its lower seat to cut off communication between the reservoir 2 and the brake cylinder 1, and, at the same time, effecting communication from the brake cylinder 1 to the atmosphere through exhaust chamber 12 and exhaust port 13. The valve 8 will remain in its lower or release position so long as the wheel 24 is slipping or sliding on the rail and causing current to flow from the generator to the winding of the magnet valve device. When the brakes have been released sufficiently to permit the wheel 24 to again roll freely upon the rail, the operating winding of the magnet valve device 6 will be deenergized and the spring 14 will force the valve 8 upwardly to its illustrated position, cutting off communication from the brake cylinder 1 to the atmosphere, and opening communication between the reservoir 2 and the brake cylinder 1, providing the brake valve 5 has remained in its brake applying position.

It will be apparent from the above description that we have provided an anti-wheel sliding mechanism that is operative to reduce the braking pressure without the necessity for the car wheel decreasing its speed to an extremely low value, but which is operative at a fixed speed differential between the car wheel and the vehicle speed, and that will remain effective until the car wheel no longer slips on the rail. The differential device may be so designed that a relatively small difference in the speeds of its differentially related parts, corresponding to, say two miles per hour below its free rolling speed, will effect a reduction in brake cylinder pressure. It will also be noted that changes in the diameter of the car wheel, due to wear, will not affect the operation of the wheel anti-sliding device and also that it is unnecessary to provide any reversing mechanism operable upon a reverse in the direction of operation of the vehicle, since the mechanism is operative upon the differential speeds of the armature and field elements of the generator regardless of the direction of operation of the vehicle.

While we have illustrated our anti-wheel sliding device as applied to a single vehicle wheel, it is obvious that it may be applied to each wheel axle, or pair of wheels, on the vehicle to which the brakes are applied.

While we have illustrated and described one preferred embodiment of our invention, it will be apparent to those skilled in the art that many changes in the circuits and apparatus described may be made within the spirit of our invention and we do not wish to be limited otherwise than by the scope of the appended claims.

Having now described our invention, what we claim as new and desire to secure by Letters Patent, is:

1. In a brake equipment for vehicles, in combination, a brake cylinder, means for supplying fluid under pressure to said brake cylinder to apply the brakes, an electrical differential device having one element driven in accordance with the speed of the vehicle and another element driven in accordance with the speed of the car wheel, and means responsive to a difference in the speed of the two elements for cutting off the supply of fluid under pressure to said brake cylinder and for releasing fluid under pressure from said brake cylinder.

2. In a brake equipment for vehicles, in combination, a brake cylinder, means for supplying fluid under pressure to said brake cylinder to apply the brakes, an electrical differential device having an armature and a field element, one of said elements being driven in accordance with the speed of the vehicle and the other element being driven in accordance with the speed of the wheel, and means responsive to a difference in the speeds of the two elements for releasing fluid under pressure from said brake cylinder to reduce the braking force.

3. In a brake equipment for vehicles, in combination, a brake cylinder, manually operable means for controlling the supply of fluid under pressure to and from said brake cylinder, electrical means operable to release fluid under pressure from said brake cylinder independently of said manually operable means, an electric generator having a field element and an armature element, means for operating one of said elements in accordance with the speed of the vehicle and means for operating the other of said elements in accordance with the speed of the vehicle wheel, said electrical means being operatively connected to said generator armature and responsive to a predetermined differential in the speeds of the two generator elements to release fluid under pressure from said brake cylinder.

4. In a brake equipment for vehicles, in combination, a brake cylinder, means for supplying fluid under pressure to said brake cylinder to apply the brakes, an electrical device having two rotating elements, a roller in engagement with the track rail for operating one of said elements, a roller in engagement with the periphery of the car wheel for operating the other of said elements, and electrically operable valve means responsive to a predetermined differential between the speeds of said two generator elements for releasing fluid under pressure from said brake cylinder.

5. In a brake equipment for vehicles, in combination, friction braking means, means for applying the brakes, an electrical device having two rotating elements, a roller in engagement with the track rail for operating one of said elements, a roller in engagement with the periphery of the car wheel for operating the other of said elements, and electrically operable means responsive to a predetermined differential between the speed of said two generator elements for reducing the braking force.

6. In a brake equipment for vehicles, in combination, friction braking means, means for applying the brakes, an electrical device having two rotating elements, a roller in engagement with the track rail for operating one of said elements, a roller in engagement with the periphery of the car wheel for operating the other of said elements, and electrically operable valve means responsive to a predetermined differential between the speeds of said elements for releasing fluid under pressure from said brake cylinder, said valve means being effective to cause a continuing decrease in the braking force so long as the predetermined differential between the speeds of said elements is maintained and effective when said differential is no longer maintained to again apply the brakes.

7. In a brake equipment for vehicles, in combination, a brake cylinder, means for supplying fluid under pressure to said brake cylinder to apply the brakes, an electrical device having two rotating elements, a roller in engagement with the track rail for operating one of said elements, a roller in engagement with the periphery of the car wheel for operating the other of said elements, and electrically operable valve means responsive to a predetermined differential between the speed of said elements for releasing fluid under pressure from said brake cylinder, said valve means being effective to cause a continuing decrease in the braking force so long as the predetermined differential between the speed of said elements is maintained and effective when said differential no longer maintains to again apply the brakes.

8. In a brake equipment for vehicles, in combination, a brake cylinder, means for supplying fluid under pressure to said brake cylinder to apply the brakes, and an electrical differential means comprising two rotary elements and having one element rotated in accordance with the peripheral speed of a car wheel and another element rotated in accordance with the speed of the vehicle for cutting off the flow of fluid under pressure to said brake cylinder and for releasing fluid under pressure therefrom.

9. In a brake equipment for vehicles, in combination, means for applying the brakes, and means for reducing the degree of application of the brakes comprising an electroresponsive device, and an electric generator cooperatively connected thereto and operative upon rotation of a vehicle wheel at a speed less than its free rolling speed, to energize said electroresponsive device to effect a reduction in the degree of application of the brakes.

10. In a brake equipment for vehicles, in combination, braking means for applying the brakes, and means including an electrical differential means having relatively movable elements operative in response to a rotative speed of a car wheel different from its free rolling speed for reducing the degree of application of the brakes.

11. In a brake equipment for vehicles, in combination, a brake cylinder, manually operable means for controlling the supply of fluid under pressure to and from said brake cylinder, electrical means operable to release fluid under pressure from said brake cylinder independently of said manually operable means, a source of electric energy comprising a generator having relatively movable armature and field elements, and means responsive to a fixed differential between the speed of the vehicle and the speed of the vehicle wheel for operatively relating said electrical means and said source.

12. In a brake equipment for vehicles, in combination, braking means for applying the brakes, an electrical differential device having relatively movable parts operative upon rotation of the wheel at a speed less than its free rolling speed for reducing the degree of application of the brakes, said electrical means being effective to cause a continuing decrease in the braking force so long as the predetermined differential between the actual speed of said wheel and its free rolling speed is maintained, and effective when said differential no longer maintains to again apply the brakes.

13. In a brake equipement for vehicles, in combination, a brake cylinder, means for supplying fluid under pressure to said brake cylinder, and electrical means comprising a differential device having relatively movable armature and field element differentially responsive to variations in the rotative speed of a wheel from its free rolling speed for cutting off the flow of fluid under pressure to said brake cylinder and for releasing fluid under pressure from said brake cylinder, said electrical means being effective to cause a continuing decrease in the braking force so long as the predetermined differential between the speed of said wheel and its free rolling speed is maintained, and effective when said differential no longer maintains to again apply the brake.

14. In a brake equipment for vehicles, in combination, a brake cylinder, means for supplying fluid under pressure to said brake cylinder, an electrical means including an electric generator having relatively movable armature and field elements responsive to the slipping of the wheel on the rail for cutting off the flow of fluid under pressure to said brake cylinder and for releasing fluid under pressure therefrom, said electrical means being effective to cause a continuing decrease in the braking force so long as the slipping of the wheel continues, and effective when the slipping of the wheel on the rail no longer continues to again permit the flow of fluid under pressure to said brake cylinder.

EARLE S. COOK.
CHARLES F. HAMMER.